(12) United States Patent
Yusa (10) Patent No.: US 11,085,560 B2
(45) Date of Patent: Aug. 10, 2021

(54) HIGH-PRESSURE HOSE

(71) Applicant: The Yokohama Rubber Co., LTD., Tokyo (JP)

(72) Inventor: Ikuma Yusa, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 77 days.

(21) Appl. No.: 16/614,312

(22) PCT Filed: Mar. 22, 2018

(86) PCT No.: PCT/JP2018/011346
§ 371 (c)(1),
(2) Date: Nov. 15, 2019

(87) PCT Pub. No.: WO2018/211818
PCT Pub. Date: Nov. 22, 2018

(65) Prior Publication Data
US 2020/0149663 A1   May 14, 2020

(30) Foreign Application Priority Data
May 16, 2017   (JP) .............................. JP2017-097088

(51) Int. Cl.
*F16L 11/08*   (2006.01)
(52) U.S. Cl.
CPC ........... *F16L 11/083* (2013.01); *F16L 11/088* (2013.01)
(58) Field of Classification Search
CPC .............................. F16L 11/083; F16L 11/099
(Continued)

(56) References Cited
U.S. PATENT DOCUMENTS 790,906 A  *  5/1905  Marks ................... B60C 9/0042
                                                                152/556
3,750,712 A  *  8/1973  Brand ................... F16L 11/086
                                                                138/124
(Continued)

FOREIGN PATENT DOCUMENTS

JP    S56-049478    5/1981
JP    S59-073684    4/1984
(Continued)

OTHER PUBLICATIONS

International Search Report for International Application No. PCT/JP2018/011346 dated May 29, 2018, 4 pages, Japan.
(Continued)

*Primary Examiner* — Craig M Schneider
*Assistant Examiner* — David R Deal
(74) *Attorney, Agent, or Firm* — Thorpe North & Western (57) ABSTRACT

A high pressure hose includes three or more reinforcing layers coaxially layered on one another between an inner surface layer and an outer surface layer coaxially layered on each other. An average braid angle obtained by averaging braid angles of the respective reinforcing layers is greater than or equal to 53.5° and less than or equal to 55.5°. The braid angles increase toward the reinforcing layer at an outermost circumference. Reinforcing wires constituting the reinforcing layer at an innermost circumference have elongation at break of greater than or equal to 3.0% and less than or equal to 4.0% and breaking strength of greater than or equal to 500 N. Reinforcing wires constituting the reinforcing layers other than the reinforcing layer at the innermost circumference have elongation at break of greater than or equal to 2.0% and less than 3.0% and breaking strength of greater than or equal to 500 N.

16 Claims, 4 Drawing Sheets

(58) Field of Classification Search
USPC .................. 138/125, 138, 134, 123, 127
See application file for complete search history.

(56) References Cited

U.S. PATENT DOCUMENTS

| | | | | |
|---|---|---|---|---|
| 4,384,595 | A * | 5/1983 | Washkewicz | F16L 11/082 138/124 |
| 4,420,018 | A * | 12/1983 | Brown, Jr. | D04C 1/02 138/124 |
| 4,585,035 | A * | 4/1986 | Piccoli | F16L 11/086 138/127 |
| 5,788,714 | A * | 8/1998 | Ouchi | A61B 1/00071 138/123 |
| 6,112,771 | A * | 9/2000 | Aoyagi | F16L 11/087 138/126 |
| 7,021,339 | B2 * | 4/2006 | Hagiwara | D04C 1/06 138/123 |
| 8,783,300 | B2 * | 7/2014 | Hahn | F16L 11/086 138/125 |
| 2010/0236655 | A1 * | 9/2010 | Gregrich | B23P 19/00 138/125 |
| 2010/0326558 | A1 | 12/2010 | Do | |
| 2012/0125470 | A1 * | 5/2012 | Nanney | F16L 11/087 138/125 |
| 2014/0373962 | A1 * | 12/2014 | Lamontia | B32B 27/304 138/125 |
| 2018/0172185 | A1 | 6/2018 | Ishii et al. | |
| 2020/0149663 | A1 * | 5/2020 | Yusa | F16L 11/087 |

FOREIGN PATENT DOCUMENTS

| | | |
|---|---|---|
| JP | H04-288920 | 10/1992 |
| JP | H07-026029 | 1/1995 |
| JP | H07-224975 | 8/1995 |
| JP | H10-132153 | 5/1998 |
| JP | H10-185018 | 7/1998 |
| JP | 2013-231251 | 11/2013 |
| JP | 2017-003105 | 1/2017 |
| WO | WO 2009/112664 | 9/2009 |
| WO | WO 2016/199643 | 12/2016 |

OTHER PUBLICATIONS

Pro Fiber Zylon, Catalogue of Fiber, Toyobo Co., Ltd., 18 pages, Japan.

\* cited by examiner

HIGH-PRESSURE HOSE

TECHNICAL FIELD

The present technology relates to a high pressure hose, and particularly relates to a high pressure hose that can provide effectively improved pressure resistance performance while suppressing change in a hose dimensions in a case where an internal pressure acts.

BACKGROUND ART

In recent years, fuel cell vehicles and the like have been actively developed. Accordingly, much effort has been made to develop a hose through which a fuel cell vehicle and the like is filled with a hydrogen gas from a dispenser installed in a hydrogen station. To increase the traveling distance of a fuel cell vehicle and the like, a fuel tank is required to be filled with a hydrogen gas at high pressure. Thus, a hose for hydrogen filling is required to be practical enough to withstand a high internal pressure of greater than or equal to 70 MPa. (See Japan Unexamined Patent Publication No. 2017-003105).

An internal pressure acting on the hose generally leads to a reduced length and an increased outer diameter of the hose. A large amount of reduction in the hose length at this time leads to a problem of making the hose connected to a coupler likely to come off the coupler. In particular, in the case of a hose for hydrogen filling, a high-pressure hydrogen gas cooled to minus 40 to minus 33° C. is used as fluid and, and when the diameter of the hose is significantly increased at this time, there is a problem in that an inner surface layer of the hose is likely to be cracked, and further, the development rate of the crack increases to reduce the life of the hose.

When the braid angle of a reinforcing layer embedded in the hose is set to approximately an angle of repose (54.7°), there is little change in the braid angle even in a case where an internal pressure acts on the hose. Thus, change in a hose dimension can be suppressed. However, in a hose in which a plurality of reinforcing layers are embedded, when the braid angle of each reinforcing layer is set to approximately the angle of repose, the reinforcing layer embedded at an innermost circumference bears an excessive internal pressure. Accordingly, each reinforcing layer cannot function sufficiently to bear the internal pressure, and the pressure resistance performance of the hose decreases. Thus, there has been difficulty in providing, in a compatible manner, suppression of change in a hose dimension in a case where an internal pressure acts and improvement of the pressure resistance performance of a hose.

SUMMARY

The present technology provides a high pressure hose that can provide effectively improved pressure resistance performance while suppressing change in a hose dimension in a case where an internal pressure acts.

An embodiment of the present technology provides a high pressure hose including an inner surface layer and an outer surface layer coaxially layered on each other and three or more reinforcing layers coaxially layered on one another between the inner surface layer and the outer surface layer, the reinforcing layers having an average braid angle of greater than or equal to 53.5° and less than or equal to 55.5°, the average braid angle being obtained by averaging braid angles of the respective reinforcing layers, the braid angles being set to increase toward the reinforcing layer at an outermost circumference, reinforcing wires constituting the reinforcing layer at an innermost circumference having elongation at break of greater than or equal to 3.0% and less than or equal to 4.0% and breaking strength of greater than or equal to 500 N, reinforcing wires constituting the reinforcing layers other than the reinforcing layer at the innermost circumference having elongation at break of greater than or equal to 2.0% and less than 3.0% and breaking strength of greater than or equal to 500 N.

According to an embodiment of the present technology, three or more reinforcing layers are provided and have an average braid angle of greater than or equal to 53.5° and less than or equal to 55.5°, braid angles are set to increase toward the reinforcing layer at the outermost circumference, and the braid angle of each of the reinforcing layers has a value close to an angle of repose. Accordingly, this is advantageous in suppressing change in a hose dimension in a case where an internal pressure acts on the hose.

Further, the reinforcing wires constituting each of the reinforcing layers are set to have breaking strength of greater than or equal to 500 N and the reinforcing wires constituting the reinforcing layer at the innermost circumference are set to have smaller elongation at break than each of the other reinforcing layers. Thus, an internal pressure acting on the hose can be transmitted efficiently from the reinforcing layer at the innermost circumference to the reinforcing layer at the outermost circumference. Thus, the reinforcing layer at the innermost circumference is prevented from bearing an excessive internal pressure, and each of the reinforcing layers evenly bears the internal pressure. Accordingly, pressure resistance performance can be improved effectively.

DETAILED DESCRIPTION

A high pressure hose according to an embodiment of the present technology will be described below based on embodiments illustrated in the drawings.

Figure 1:
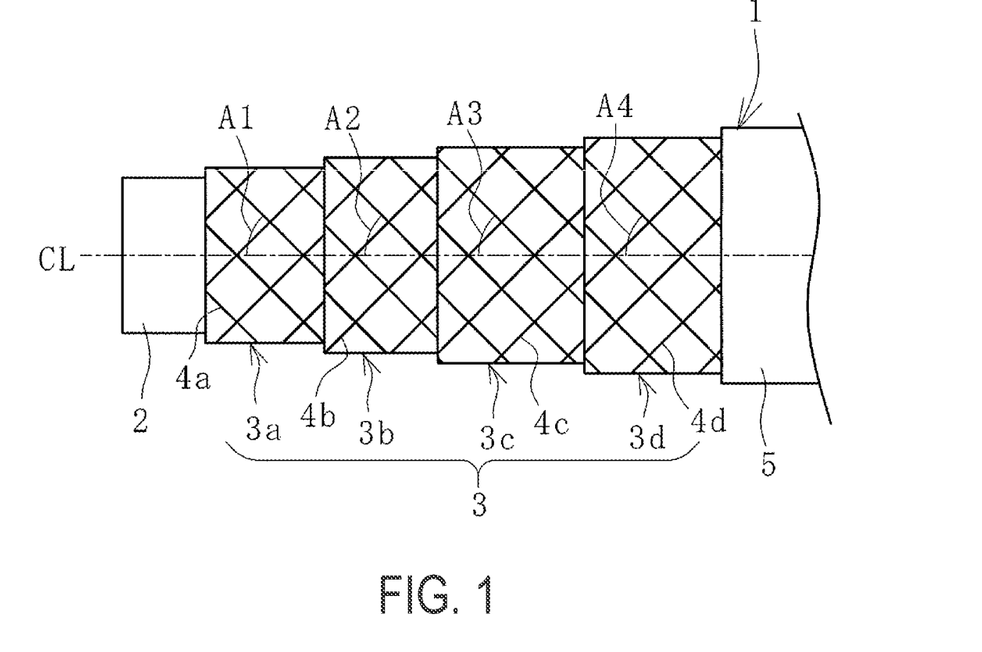
FIG. 1 is a partially cutaway side view illustrating a high pressure hose according to an embodiment of the present technology.
Figure 2:
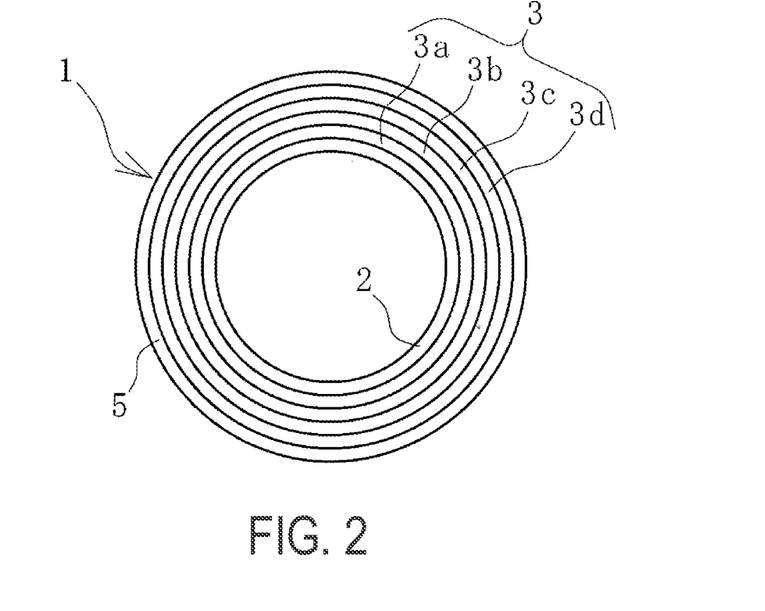
FIG. 2 is an explanatory view illustrating, in a cross-sectional view, the high pressure hose of FIG. 1.

As illustrated in FIGS. 1 and 2, a high pressure hose 1 according to an embodiment of the present technology includes a multilayer structure including, in order from an inner circumference, an inner surface layer 2, reinforcing layers 3 (a first reinforcing layer 3a, a second reinforcing layer 3b, a third reinforcing layer 3c, and a fourth reinforcing layer 3d) and an outer surface layer 5 coaxially layered on one another. A dot-dash line CL in FIG. 1 indicates a hose axial center.

Fluid flowing through the high pressure hose 1 directly comes into contact with an inner circumferential surface of the inner surface layer 2. Thus, a material suitable for the fluid flowing is used. For example, in a case where the fluid flowing is a hydrogen gas H, the inner surface layer 2 is formed of a thermoplastic resin having a gas permeation coefficient of $1\times10^{-8}$ cc sec/cm$^2$ sec. cmHg or less for a dry hydrogen gas at 90° C. The gas permeation coefficient is a value measured in accordance with JIS (Japanese Industrial Standard) K7126. Examples of the thermoplastic resin can include nylon (nylon 6, nylon 66, nylon 11, and the like), polyacetal, and an ethylene vinyl alcohol copolymer. By using a resin having good hydrogen gas barrier properties for the inner surface layer 2 in this manner, excellent hydrogen gas permeation resistance can be obtained.

The inner diameter of the inner surface layer 2 (i.e., the inner diameter of the hose 1) is not particularly limited, but is set to, for example, greater than or equal to 4 mm and less than or equal to 12 mm. A larger inner diameter of the inner surface layer 2 is advantageous in increasing the flow rate of the fluid, and a smaller inner diameter of the inner surface layer 2 is advantageous in securing pressure resistance.

The layer thickness of the inner surface layer 2 is set to, for example, greater than or equal to 0.5 mm and less than or equal to 2.0 mm, and more preferably greater than or equal to 0.5 mm and less than or equal to 1.5 mm. To suppress change in the dimension of the inner surface layer 2, the inner surface layer 2 preferably has an increased layer thickness. On the other hand, to secure the flexibility of the high pressure hose 1, the inner surface layer 2 preferably has a reduced layer thickness. To secure the durability of the inner surface layer 2 and to secure a flow rate of the hydrogen gas H, the inner surface layer 2 preferably has a layer thickness of greater than or equal to 0.5 mm and less than or equal to 1.5 mm, and an inner diameter of greater than or equal to 5 mm and less than or equal to 10 mm.

An outermost circumferential surface of the outer surface layer 5 (outermost circumferential surface of the hose 1) is formed of a thermoplastic resin. The outer surface layer 5 can include a single layer structure including a thermoplastic resin or a multilayer structure including a rubber and a thermoplastic resin. Examples of the thermoplastic resin forming the outer surface layer 5 can include polyurethane and polyester. Examples of the rubber can include chloroprene acrylo rubber, butyl rubber, ethylene propylene rubber, and chlorosulfonated polyethylene rubber.

The layer thickness of the outer surface layer 5 is set to, for example, greater than or equal to 0.2 mm and less than or equal to 1.5 mm, and more preferably greater than or equal to 0.5 mm and less than or equal to 1.0 mm. The outer diameter of the outer surface layer 5 (i.e., the outer diameter of the high pressure hose 1) is not particularly limited, but is set to, for example, greater than or equal to 12 mm and less than or equal to 18 mm. An increased layer thickness of the outer surface layer 5 is advantageous in securing the weather resistance of the high pressure hose 1, and a reduced layer thickness of the outer surface layer 5 is advantageous in securing the flexibility of the high pressure hose 1. To provide the weather resistance and flexibility of the high pressure hose 1 in a compatible manner, the layer thickness and the outer diameter of the outer surface layer 5 are preferably set within the ranges described above.

It is only required that three or more reinforcing layers 3 are provided, but in this embodiment, four reinforcing layers 3a, 3b, 3c and 3d are provided. Each of the reinforcing layers 3a, 3b, 3c and 3d has a braid structure formed by braiding a plurality of reinforcing wires at predetermined braid angles A1, A2, A3 and A4 with respect to the hose axial center CL.

An average braid angle obtained by averaging the braid angles A1 to A4 of the reinforcing layers 3a to 3d is set to be greater than or equal to 53.5° and less than or equal to 55.5°. Additionally, the braid angles are set to increase toward the reinforcing layer 3 at an outermost circumference (A1<A2<A3<A4). Accordingly, the braid angles A1 to A4 of the reinforcing layers 3a to 3d each have a value close to the angle of repose (54.7°).

A difference between the braid angles of the reinforcing layers 3 adjacent to each other and layered on each other is set to a small value, for example, greater than or equal to 1° and less than or equal to 3°. Specifically, the braid angle A1 may be greater than or equal to 48° and less than or equal to 53°, the braid angle A2 may be greater than or equal to 51° and less than or equal to 56°, the braid angle A3 may be greater than or equal to 54° and less than or equal to 59°, and the braid angle A4 may be greater than or equal to 55° and less than or equal to 60°. More preferably, the braid angles A1, A2, A3 and A4 are each greater than or equal to 50.5° and less than or equal to 57°.

Additionally, reinforcing wires 4a constituting the reinforcing layer 3a at the innermost circumference are set to have elongation at break of greater than or equal to 3.0% and less than or equal to 4.0% and breaking strength of greater than or equal to 500 N. Reinforcing wires 4b, 4c and 4d constituting the reinforcing layers 3b, 3c and 3d other than the reinforcing layer at the innermost circumference are set to have elongation at break of greater than or equal to 2.0% and less than 3.0%, and breaking strength of greater than or equal to 500 N. Namely, the reinforcing wires 4a are specified to be slightly easier to stretch than the other reinforcing wires 4b to 4d. The breaking strength and the elongation at break are values obtained by performing tests under test conditions specified in "8.5 tensile strength and elongation ratio" in JIS L 1017: 2002.

In this way, the reinforcing wires 4b to 4d constituting the reinforcing layers 3b to 3d are set to have a higher modulus than the reinforcing wires 4a constituting the reinforcing layer 3a at the innermost circumference. The reinforcing wires 4b to 4d are set to have equivalent elongation at break and equivalent breaking strength or elongation at break and breaking strength increasing toward the reinforcing wires constituting the reinforcing layer 3 at the outermost circumference. Note that the reinforcing wires 4a to 4d in the respective reinforcing layers 3a to 3d of the braid structure are set to have braid density of greater than or equal to 70%. Braid density refers to the area ratio, represented as a percentage, of the reinforcing wires 4a to 4d to the reinforcing layers 3a to 3d, respectively, and is 100% in a case where the reinforcing wires are braided with no gaps.

In this embodiment, high-strength fibers are used for the reinforcing wires 4a, 4b and 4c respectively constituting the reinforcing layer 3a at the innermost circumference, the reinforcing layer 3b at the second innermost circumference, and the reinforcing layer 3c at the third innermost circumference. The reinforcing wires 4d constituting the reinforcing layer 3d at the outermost circumference are metal wires.

"High-strength fibers" refer to fibers with tensile strength of greater than or equal to 2 GPa. Specifically, examples of the high-strength fibers can include polyparaphenylene benzobisoxazole fibers (PBO fibers), aramid fibers, and carbon fibers. The high-strength fibers have a wire diameter of, for example, greater than or equal to 0.25 mm and less than or equal to 3.5 mm. For the high-strength fibers, monofilaments can also be used, or twisted cords obtained by twisting a plurality of filaments can also be used.

Examples of the metal wires can include: piano wires (specifications defined in JIS G 3502), hard steel wires (specifications defined in JIS G 3506), hard steel wires (specifications defined by JIS G 3521), stainless steel wires (specifications defined in JIS G 4308), copper and copper alloy wires (specifications specified in JIS H 3260), aluminum and aluminum alloy wires (specifications defined in JIS H 4040), magnesium alloy wires (specifications defined in JIS H 4203), titanium and titanium alloy wires (specifications defined in JIS H 4670), and wires obtained by performing drawing treatment on the above-described wires. The metal wires have a wire diameter of, for example, greater than or equal to 0.25 mm and less than or equal to 0.40 mm.

Figure 3:
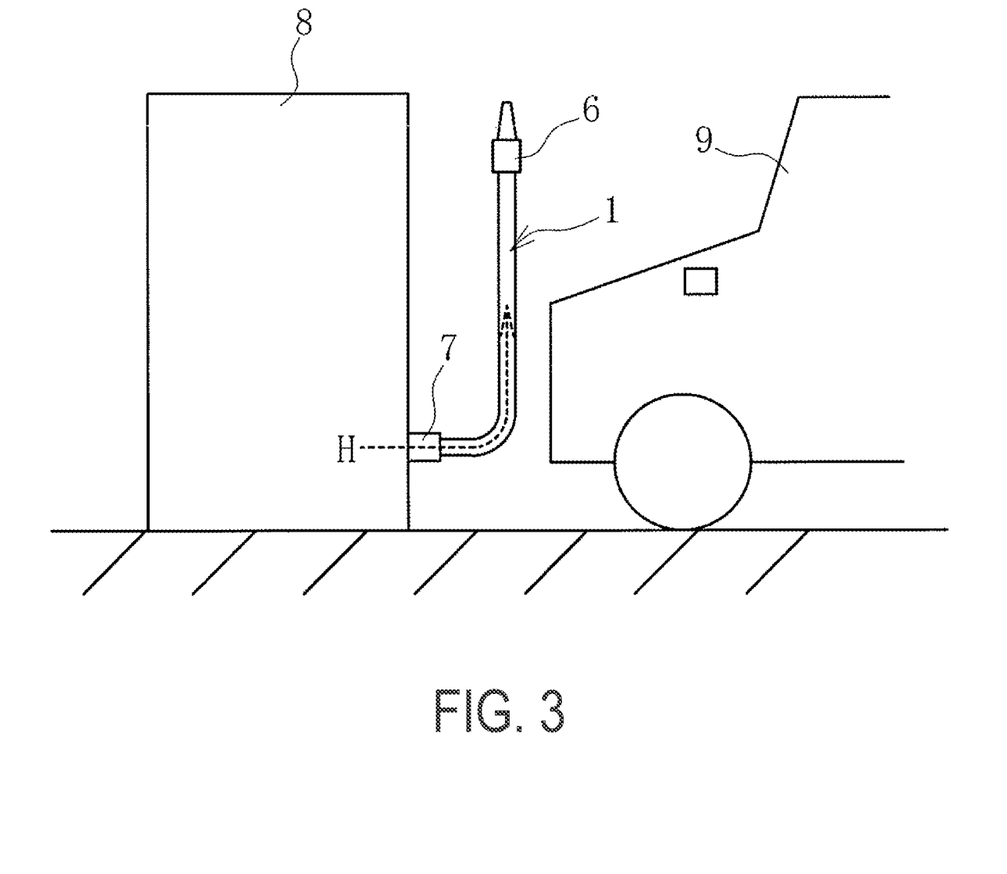
FIG. 3 is an explanatory view illustrating a usage example of the high pressure hose of FIG. 1.

As illustrated in FIG. 3, in a case where the high pressure hose 1 is provided in a dispenser 8 installed in a hydrogen station, an injector 6 is attached to one end of the high pressure hose 1 and a coupler 7 is attached to the other end of the high pressure hose 1, with the ends swaged. The high pressure hose 1 is connected to the dispenser 8 via the coupler 7. The hydrogen gas H having a high-pressure (for example, greater than or equal to 45 MPa and less than or equal to 87.5 MPa) is fed from a dispenser 8 to a vehicle 9 through the high pressure hose 1 at low temperature (e.g., higher than or equal to minus 40° and lower than or equal to minus 20°).

According to the high pressure hose 1 according to an embodiment of the present technology, three or more reinforcing layers 3 are provided, and the braid angles A1 to A4 of the respective reinforcing layers 3 are each set to a value close to the angle of repose. Thus, even when a high internal pressure acts on the high pressure hose 1, there is no significant change in each of the braid angles A1 to A4, and this is advantageous in suppressing change in the dimension of the high pressure hose 1. Namely, this is advantageous in suppressing change in the length and the outer diameter of the high pressure hose 1 in a case where a hose internal pressure acts.

Accordingly, as illustrated in FIG. 3, in a case where the vehicle 9 is filled with the hydrogen gas H through the high pressure hose 1, change in the length of the high pressure hose 1 is suppressed in spite of action of a high hose internal pressure. Thus, a defect such as disengagement of the coupler 7 from the dispenser 8 can be prevented. Additionally, an increase in the diameter of the high pressure hose 1 is suppressed, and thus, this is advantageous in preventing a defect such as damage to the inner surface layer 2 due to an internal pressure. Accordingly, this is advantageous in extending the life of the high pressure hose 1. In particular, in the high pressure hose 1 for hydrogen filling through which the hydrogen gas H having a high-pressure and low-temperature flows, since the inner surface layer 2 is embrittled at low temperature under the influence of the hydrogen gas H, an increase in a diameter makes the inner surface layer 2 susceptible to damage. However, according to an embodiment of the present technology, an increase in a diameter is suppressed, and thus, this is very effective for inhibiting damage to the inner surface layer 2.

Further, the reinforcing wires 4a to 4d constituting the respective reinforcing layers 3a to 3d are set to have breaking strength of greater than or equal to 500 N, and the reinforcing wires 4a constituting the reinforcing layer 3a at the innermost circumference are set to have larger elongation at break than the reinforcing wires 4b to 4d in the other reinforcing layers 3b to 3d. Accordingly, even though the braid angles A1 to A4 of the respective reinforcing layers 3a to 3d are set to a value close to the angle of repose, the reinforcing layer 3a at the innermost circumference is prevented from bearing an excessive internal pressure, and the reinforcing layers 3a to 3d evenly bear an internal pressure. As a result, an internal pressure acting on the high pressure hose 1 is efficiently transmitted from the reinforcing layer 3a at the innermost circumference to the reinforcing layer 3d at the outermost circumference, and pressure resistance performance can be improved effectively.

Figure 4:
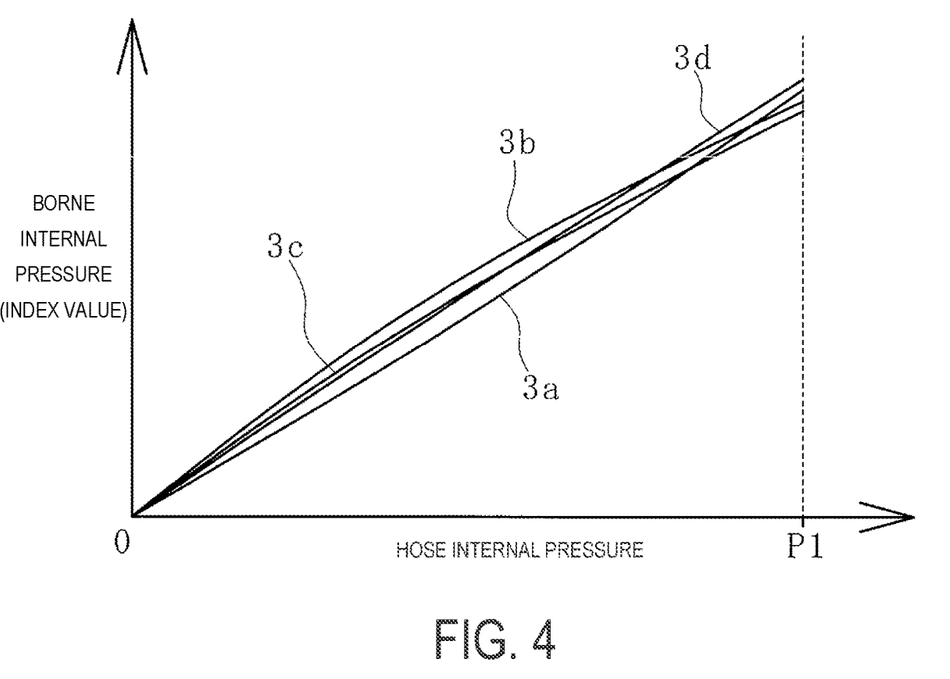
FIG. 4 is a graph showing an internal pressure borne by each of reinforcing layers of FIG. 1.

Simulated calculation indicates that, in the high pressure hose 1 according to an embodiment of the present technology, in a case where a hose internal pressure acts, the reinforcing layers 3a to 3d bear substantially the same internal pressure as shown in FIG. 4. Graphs shown in FIGS. 4 and 5 described below indicate, on a vertical axis, the internal pressure borne by each of the reinforcing layers 3a to 3d. The borne internal pressure is expressed as an index value by dividing the internal pressure by a predetermined reference value. Accordingly, FIG. 4 shows variation in the internal pressure borne by each of the reinforcing layers 3a to 3d at any hose internal pressure. According to the high pressure hose 1 according to an embodiment of the present technology, at a hose internal pressure ranging from zero to a burst pressure P1 for the high pressure hose 1, an internal pressure borne by each of the reinforcing layers 3a to 3d is within the range of ±5% of an average borne internal pressure obtained by averaging the internal pressures borne by the respective reinforcing layers 3a to 3d.

Figure 5:
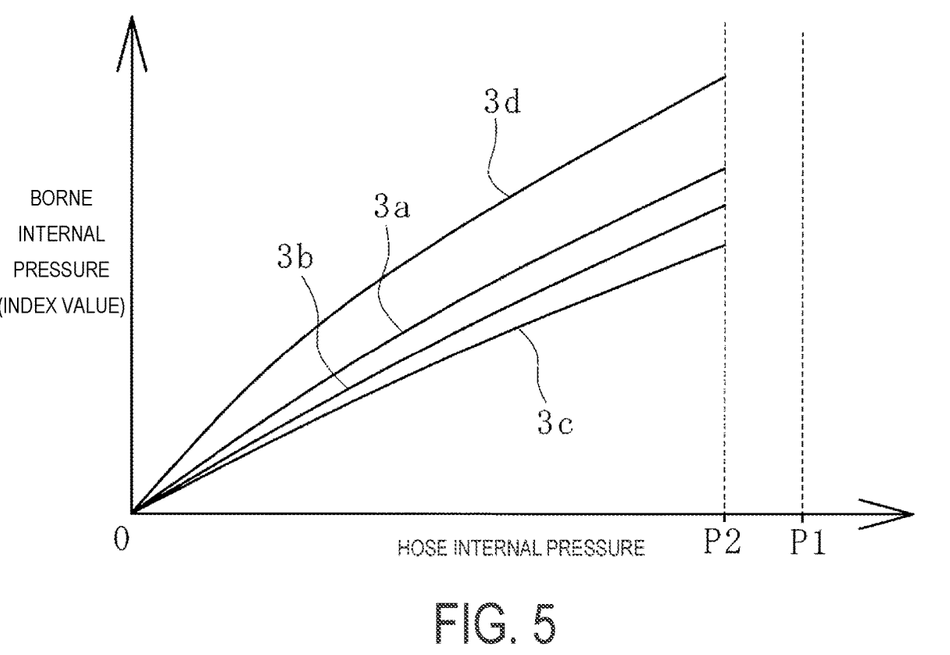
FIG. 5 is a graph showing an internal pressure borne by each of reinforcing layers in a case where reinforcing wires of the respective reinforcing layers of FIG. 1 are specified to have an equivalent modulus.

On the other hand, in contrast to the high pressure hose 1 according to an embodiment of the present technology, in the case of a high pressure hose specified such that the reinforcing wires 4a to 4d constituting the respective reinforcing layers 3a to 3d have equivalent elongation at break (modulus), an internal pressure borne by each of the reinforcing layers 3 in a case where a hose internal pressure acts varies significantly as shown in FIG. 5. Namely, in the high pressure hose specified as described above, at a hose internal pressure ranging from zero to a burst pressure P2 for the high pressure hose 1, an internal pressure borne by each of the reinforcing layers 3a to 3d fails to be within the range of ±5% of an average borne internal pressure obtained by averaging the internal pressures borne by the respective reinforcing layers 3a to 3d. For example, the borne internal pressure is marginally within the range of ±30% of the average borne internal pressure, and there is a significant variation. Specifically, the reinforcing layer 3a at the innermost circumference bears a significantly higher internal pressure than the reinforcing layers 3b and 3c, and the reinforcing layer 3d at the outermost circumference bears the highest internal pressure.

In the specification of the high pressure hose shown in FIG. 5, the acting internal pressure fails to be efficiently transmitted from the reinforcing layer 3a at the innermost circumference to the reinforcing layer 3d at the outermost circumference. Thus, the burst pressure P2 of the high pressure hose shown in FIG. 5 decreases to be lower than the burst pressure P1 of the high pressure hose 1 shown in FIG. 4, and pressure resistance performance cannot be improved.

Figure 6:
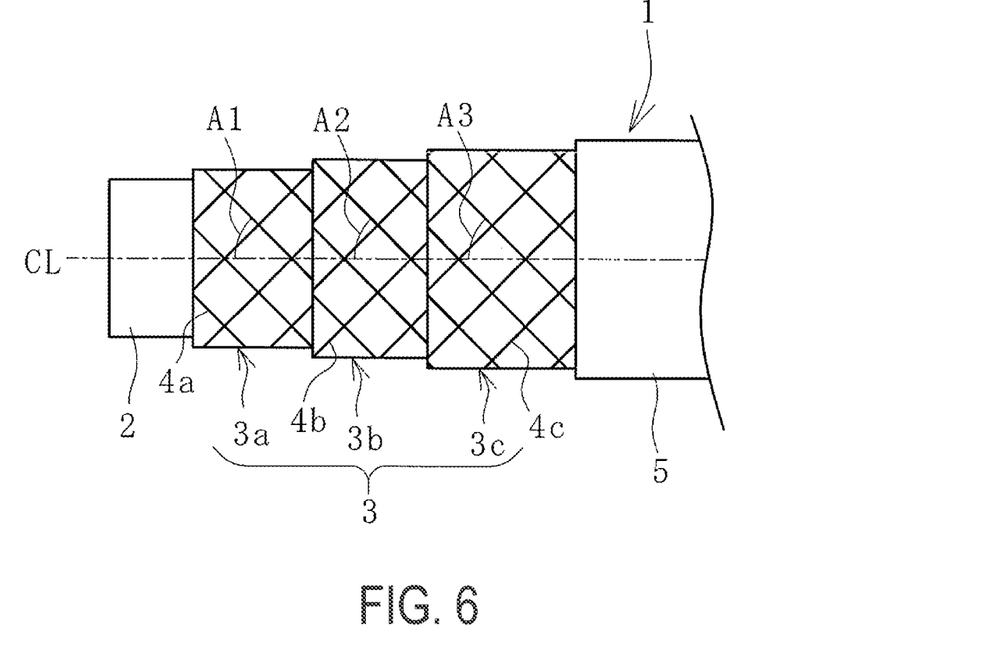
FIG. 6 is a partially cutaway side view illustrating a high pressure hose according to another embodiment of the present technology.

As illustrated in FIG. 6, the high pressure hose 1 according to an embodiment of the present technology can also be specified to include three reinforcing layers 3. Again in this case, as with the embodiment described above, an average braid angle obtained by averaging braid angles of the respective reinforcing layers 3 is set to be greater than or equal to 53.5° and less than or equal to 55.5°, and the braid angles are set to increase toward the reinforcing layer 3 at the outermost circumference (A1<A2<A3). Additionally, the reinforcing wires 4a constituting the reinforcing layer 3a at the innermost circumference are set to have elongation at break of greater than or equal to 3.0% or less than or equal to 4.0% and breaking strength of greater than or equal to 500 N, and the reinforcing wires 4b and 4c constituting the reinforcing layers 3b and 3c other than the reinforcing layer at the innermost circumference are set to have elongation at break of greater than or equal to 2.0% or less than or equal to 3.0% and breaking strength of greater than or equal to 500 N. The various specifications in the embodiments described above can also be applied to the embodiment illustrated in FIG. 6.

Figure 7:
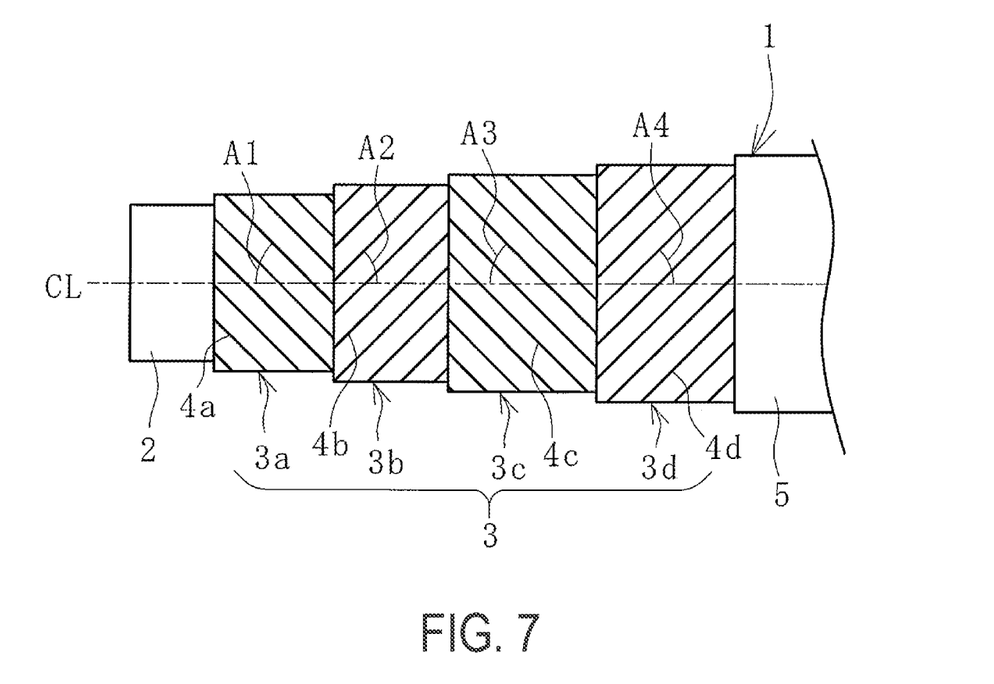
FIG. 7 is a partially cutaway side view illustrating a high pressure hose according to yet another embodiment of the present technology.

In the high pressure hose 1 according to an embodiment of the present technology, all the reinforcing layers 3 can include not only the braid structure as illustrated in FIGS. 1 and 6, but also a spiral structure in which the reinforcing wires 4a to 4b are spirally wound around the hose axial center CL, as illustrated in FIG. 7. As compared to the case of employing the braid structure, in the case of employing the spiral structure for the reinforcing layers 3, the braided density of the reinforcing wires 4a to 4d can be increased and thus, this is advantageous in improving pressure resistance performance. In the case of employing the spiral structure, each of the reinforcing layers 3 is set to have braid density of greater than or equal to 90%. The various specifications in the embodiments described above can also be applied to the embodiment illustrated in FIG. 7.

In the high pressure hose 1 according to an embodiment of the present technology, the reinforcing layers 3 of the braid structure can be mixed with the reinforcing layers 3 of the spiral structure. As compared to the case of employing the spiral structure, in the case of employing the braid structure for the reinforcing layers 3, the bending rigidity of the high pressure hose 1 decreases, and flexibility improves.

EXAMPLE

In the high pressure hose of the structure illustrated in FIGS. 1 and 2, two types of test samples (example and comparative example) that differed from each other only in the specifications of the reinforcing layers of the braid structure as shown in Table 1 were produced, and pressure resistance tests were performed on the test samples. First reinforcing layer, second reinforcing layer, third reinforcing layer, and fourth reinforcing layer in Table 1 respectively mean a reinforcing layer disposed at an innermost circumference (reinforcing layer at an innermost circumference), a reinforcing layer disposed at a second innermost circumference, a reinforcing layer disposed at a third innermost circumference, and a reinforcing layer disposed at a fourth innermost circumference (reinforcing layer at an outermost circumference). The pressure resistance tests measure a burst pressure in accordance with the method described in JIS K6330-2.

Table 1 indicates a burst pressure, a maximum rate of change in a hose length, and a maximum rate of expansion of a hose (maximum rate of change in an outer diameter) that were measured in the pressure resistance tests. The maximum rate of change in a hose length and the maximum rate of expansion of a hose are expressed as index values, with the comparative example being assigned the value of 100, and smaller values indicate smaller rates of change.

TABLE 1

|  | Comparative Example | Example |
| --- | --- | --- |
| Inner surface layer | Material: nylon 11 | |
|  | Layer thickness: 1.0 mm, inner diameter: 8.0 mm | |
| Outer surface layer | Material: Polyester | |
|  | Layer thickness: 0.8 mm, outer diameter: 16 mm | |
| First reinforcing layer | Reinforcing wire material: PBO fiber, wire diameter: 0.28 mm | |
| Blade structure | Braid angle: 51°, braid density: approximately from 70 to 80% | |
|  | Elongation at break of reinforcing wires (%) | |
|  | 3.5 | |
|  | Breaking strength of reinforcing wires (N) | |
|  | 570 | |
| Second reinforcing layer | Reinforcing wire material: PBO fiber, wire diameter: 0.28 mm | |
| Blade structure | Braid angle: 53°, braid density approximately from 70 to 80% | |
|  | Elongation at break of reinforcing wires (%) | |
|  | 3.5 | 2.6 |
|  | Breaking strength of reinforcing wires (N) | |
|  | 570 | 590 |
| Third reinforcing layer | Reinforcing wire material: PBO fiber, wire diameter: 0.28 mm | |
| Blade structure | Braid angle: 53°, braid density approximately from 70 to 80% | |
|  | Elongation at break of reinforcing wires (%) | |
|  | 3.5 | 2.6 |
|  | Breaking strength of reinforcing wires (N) | |
|  | 570 | 590 |
| Fourth reinforcing layer | Reinforcing wire material: metal wire, wire diameter: 0.28 mm | |
| Blade structure | Braid angle: 57°, braid density from 70 to 80% | |
|  | Elongation at break of reinforcing wires (%) | |
|  | 3.5 | 2.6 |
|  | Breaking strength of reinforcing wires (N) | |
|  | 180 | 180 |
| Burst pressure (MPa) | 380 | 480 |
| Maximum rate of change in hose length (index value) | 100 | 100 |
| Maximum rate of expansion of hose (index value) | 100 | 65 |

As can be seen from the results in Table 1, as compared to the comparative example, the example has an improved burst pressure, an equivalent maximum rate of change in a hose length, and a lower maximum rate of expansion of a hose.

The invention claimed is:

1. A high pressure hose comprising an inner surface layer and an outer surface layer coaxially layered on each other and three or more reinforcing layers coaxially layered on one another between the inner surface layer and the outer surface layer, the reinforcing layers having an average braid angle of greater than or equal to 53.5° and less than or equal to 55.5°, the average braid angle being obtained by averaging braid angles of the respective reinforcing layers, the braid angles being set to increase toward the reinforcing layer at an outermost circumference, reinforcing wires constituting the reinforcing layer at an innermost circumference having elongation at break of greater than or equal to 3.0% and less than or equal to 4.0% and breaking strength of greater than or equal to 500 N, reinforcing wires constituting the reinforcing layers other than the reinforcing layer at the innermost circumference having elongation at break of greater than or equal to 2.0% and less than 3.0% and breaking strength of greater than or equal to 500 N.

2. The high pressure hose according to claim 1, wherein a braid angle of each of the reinforcing layers is set to range from greater than or equal to 50.5° to less than or equal to 57°.

3. The high pressure hose according to claim 2, wherein the reinforcing layers have a braid structure with braid density of greater than or equal to 70% or a spiral structure with braid density of greater than or equal to 90%.

4. The high pressure hose according to claim 3, wherein all the reinforcing layers have a braid structure.

5. The high pressure hose according to claim 4, wherein the reinforcing wires constituting the reinforcing layer at the outermost circumference are metal wires, and the reinforcing wires constituting the reinforcing layers other than the reinforcing layer at the outermost circumference are high-strength fibers.

6. The high pressure hose according to claim 5, wherein the high-strength fibers are polyparaphenylene benzobisoxazole fibers.

7. The high pressure hose according to claim 6, wherein the metal wires have a wire diameter of greater than or equal to 0.25 mm and less than or equal to 0.40 mm and the high-strength fibers have a wire diameter of greater than or equal to 0.25 mm and less than or equal to 3.5 mm.

8. The high pressure hose according to claim 7, wherein the inner surface layer has a layer thickness of greater than or equal to 0.5 mm and less than or equal to 1.5 mm, and an inner diameter of greater than or equal to 4 mm and less than or equal to 12 mm.

9. The high pressure hose according to claim 8, wherein the inner surface layer comprises a thermoplastic resin having a gas permeation coefficient of less than or equal to $1\times10^{-8}$ cc·cm/cm$^2$·sec.·cmHg for a dry hydrogen gas at 90° C., and fluid flowing through the hose is a hydrogen gas.

10. The high pressure hose according to claim 1, wherein the reinforcing layers have a braid structure with braid density of greater than or equal to 70% or a spiral structure with braid density of greater than or equal to 90%.

11. The high pressure hose according to claim 10, wherein all the reinforcing layers have a braid structure.

12. The high pressure hose according to claim 1, wherein the reinforcing wires constituting the reinforcing layer at the outermost circumference are metal wires, and the reinforcing wires constituting the reinforcing layers other than the reinforcing layer at the outermost circumference are high-strength fibers.

13. The high pressure hose according to claim 12, wherein the high-strength fibers are polyparaphenylene benzobisoxazole fibers.

14. The high pressure hose according to claim 12, wherein the metal wires have a wire diameter of greater than or equal to 0.25 mm and less than or equal to 0.40 mm and the high-strength fibers have a wire diameter of greater than or equal to 0.25 mm and less than or equal to 3.5 mm.

15. The high pressure hose according to claim 1, wherein the inner surface layer has a layer thickness of greater than or equal to 0.5 mm and less than or equal to 1.5 mm, and an inner diameter of greater than or equal to 4 mm and less than or equal to 12 mm.

16. The high pressure hose according to claim 1, wherein the inner surface layer comprises a thermoplastic resin having a gas permeation coefficient of less than or equal to $1\times10^{-8}$ cc·cm/cm$^2$·sec.·cmHg for a dry hydrogen gas at 90° C., and fluid flowing through the hose is a hydrogen gas.

* * * * *